United States Patent [19]

Daraz

[11] Patent Number: 4,575,058
[45] Date of Patent: Mar. 11, 1986

[54] VARI-TORQUE BAR SHOCK ABSORBER FOR A RACING VEHICLE

[76] Inventor: Bernard B. Daraz, P.O. Box 3097 Ridgeway Post Office, Stamford, Conn. 06905

[21] Appl. No.: 612,452

[22] Filed: May 21, 1984

[51] Int. Cl.[4] .............................................. F16F 3/04
[52] U.S. Cl. .................... 267/70; 213/46 A; 267/177; 280/724
[58] Field of Search ............... 267/4, 70, 69, 73, 177, 267/170; 280/724; 213/46 R, 46 A, 47, 48, 49

[56] References Cited

U.S. PATENT DOCUMENTS

| | | | |
|---|---|---|---|
| 140,192 | 6/1873 | Godley | 267/4 |
| 616,338 | 12/1898 | Lanham | 213/46 A |
| 624,327 | 5/1899 | Hammond | 267/70 X |
| 857,211 | 6/1907 | Stapp | 213/47 |
| 1,288,659 | 12/1918 | O'Connor | 213/49 |
| 1,302,436 | 4/1919 | Rogers | 213/46 R |
| 1,404,197 | 1/1922 | Gendall | 267/70 |
| 1,539,165 | 5/1925 | DeBurger et al. | 213/46 A |
| 2,070,563 | 2/1937 | Cusack | 267/70 X |
| 2,186,267 | 1/1940 | Page | 213/46 R |
| 2,215,238 | 9/1940 | Wert | 267/70 X |
| 2,421,822 | 6/1947 | Wood | 267/70 X |
| 3,120,951 | 2/1964 | Finch | 267/70 X |

FOREIGN PATENT DOCUMENTS

| | | | |
|---|---|---|---|
| 699265 | 11/1940 | Fed. Rep. of Germany | 267/70 |
| 570947 | 1/1924 | France | 267/72 |

Primary Examiner—George E. A. Halvosa
Attorney, Agent, or Firm—Parmelee, Bollinger & Bramblett

[57] ABSTRACT

A vari-torque bar shock absorber is provided in place of solid non-flexible bars to locate and support the rear end of a racing car. The shock absorber has a torque tube with a torque rod movably mounted therein. The torque rod carries a torque plate which move together in the torque tube. First and second stop plates are removably mounted adjacent opposite ends of the torque tube. A plurality of heavy duty coil springs are removably mounted between the first and second stop plates and the torque plate. This shock absorber may be mounted either vertically or horizontally with respect to the vehicle chassis and offers lower weight, adjustability and simplicity in changing the springs and accommodates the use of a different set of springs for the different damping rates for acceleration control and another totally different rate for deceleration control.

3 Claims, 7 Drawing Figures

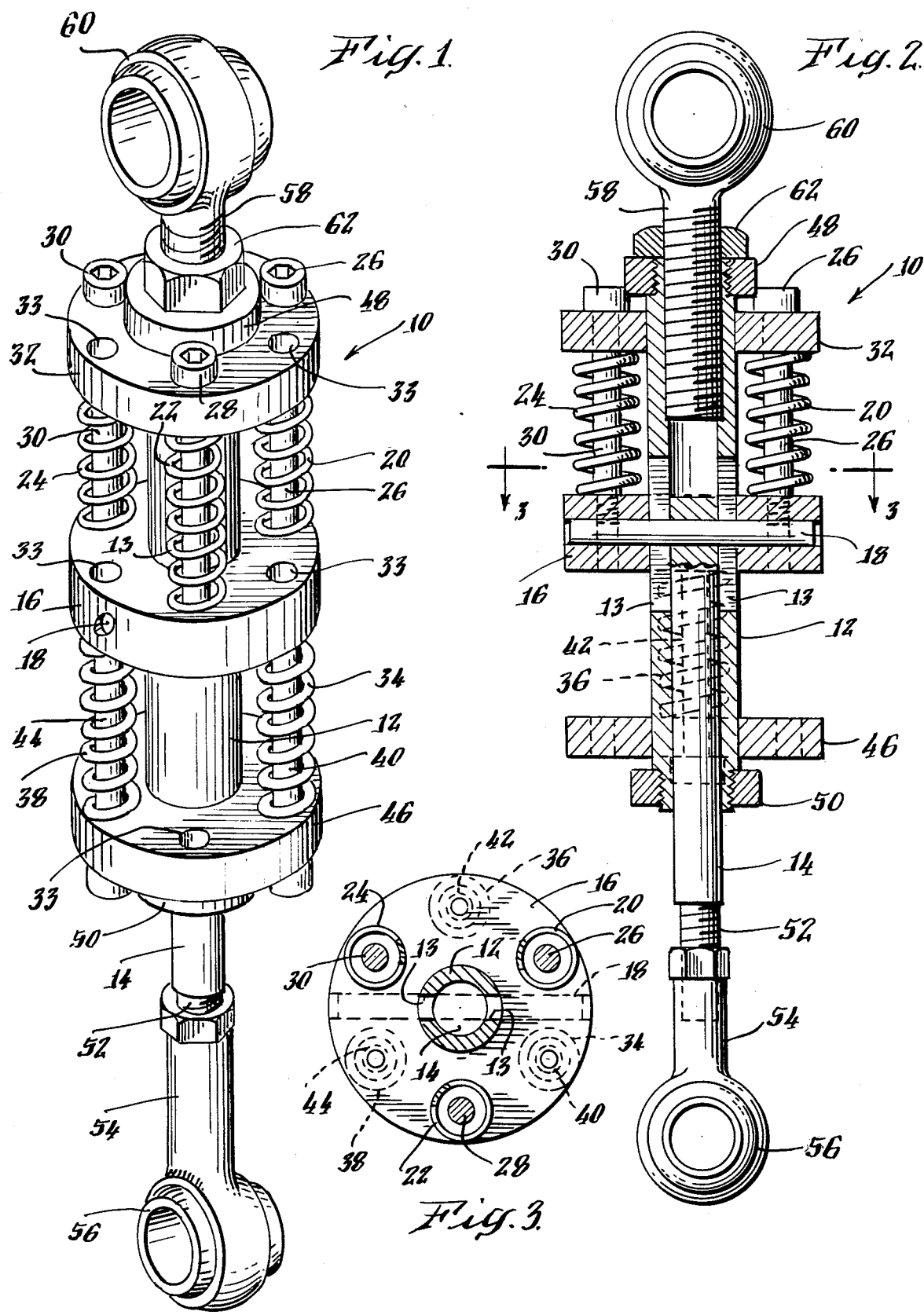

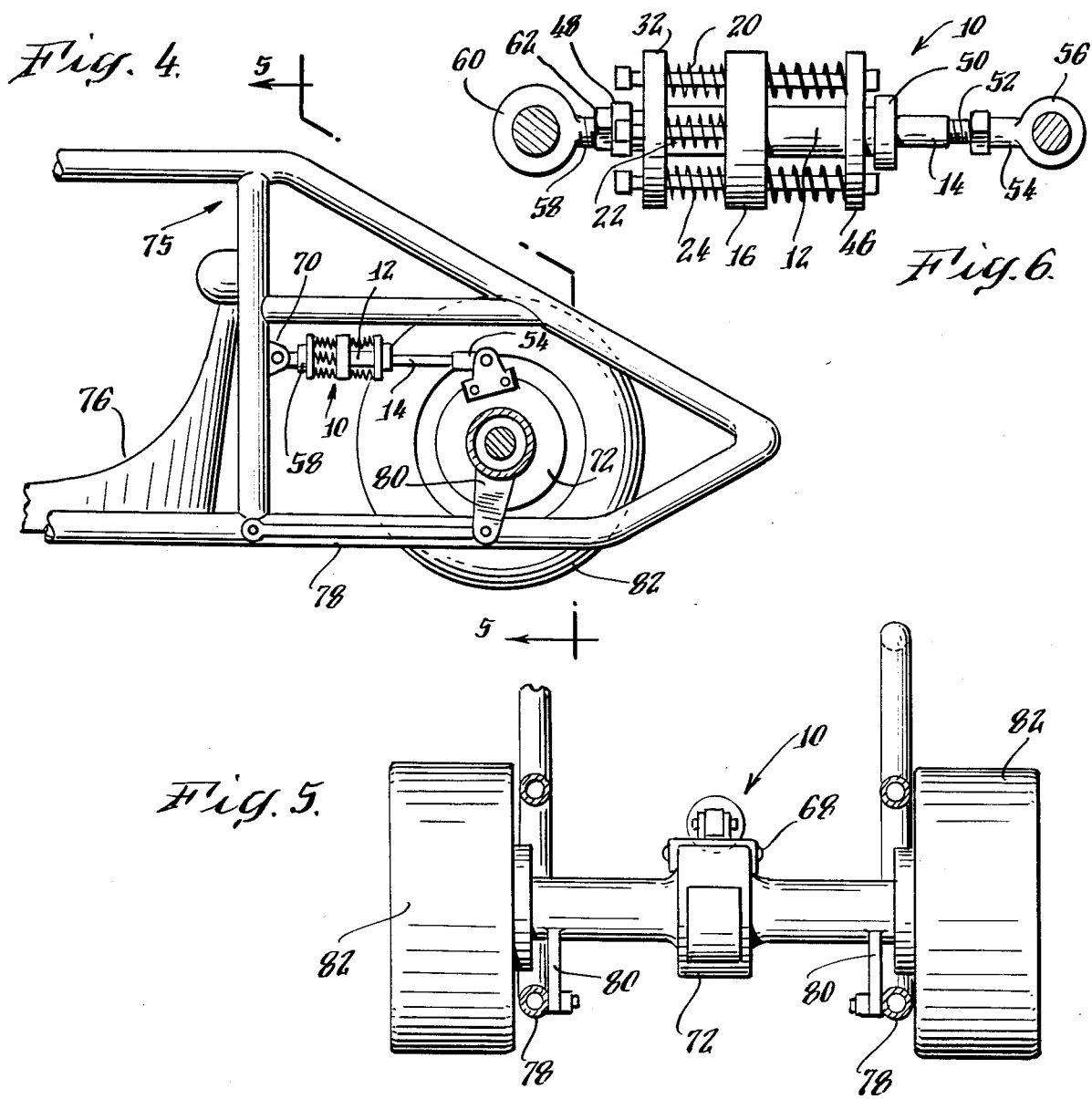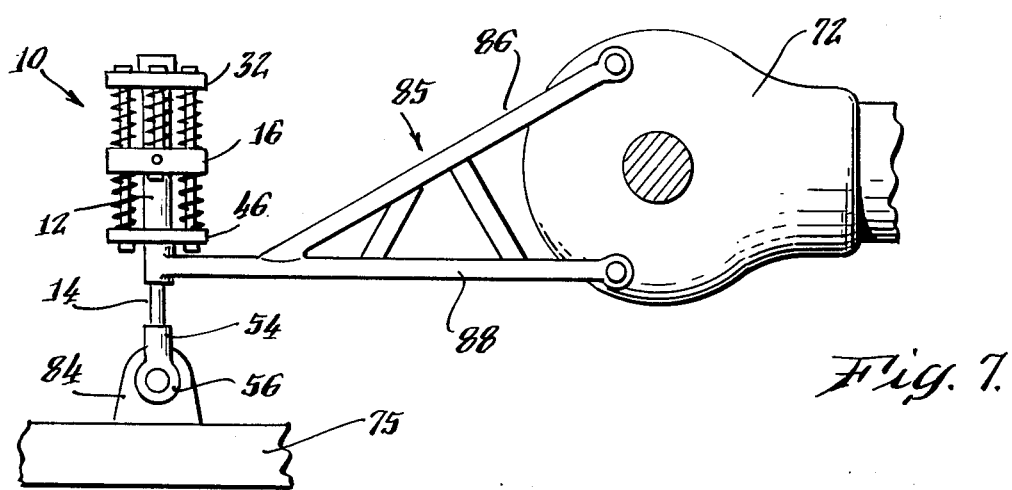

VARI-TORQUE BAR SHOCK ABSORBER FOR A RACING VEHICLE

BACKGROUND OF THE INVENTION

This invention relates to a shock absorber for a racing vehicle which allows a smooth transition of acceleration and deceleration torque to prevent the direct transfer of such torque directly to the tires and/or suspension rendering such a car difficult to drive and control.

The purpose of shock absorbers as applied to racing vehicles differs substantially from that used on regular cars, trucks and other types of moving vehicles in which the purpose is to maintain the wheels of the vehicles in contact with the surface on which it rides and to absorb shock from bumps. In this racing application, the primary purpose is to handle the transition between the acceleration and deceleration torque which are substantially greater due to the speeds involved. In addition to employing a shock absorber on each wheel, another shock absorber for handling torque variations is applied in the racing application and that is positioned in either a three-point or a four-point application in front of the rear axle and differential. Prior art units have been provided which are either not adjustable or fit only in one configuration or either a three-point or a four-point mounting for which they are designed. Such devices are also heavy or lack flexibility or adjustability and are high priced. No known currently available shock absorber may be utilized in the vertical and horizontal mounting applications.

SUMMARY OF THE INVENTION

Accordingly, it is an object of this invention to provide a novel and improved vari-torque bar shock absorber for racing vehicles which allows a smooth transition of acceleration and deceleration torque when applied to such a vehicle.

Another object of this invention is to provide a new and improved shock absorber for a racing car which is readily adjustable.

Still a further object of this invention is to provide a new and improved shock absorber for a racing vehicle which may be mounted in a different manner for different applications and is cheaper than prior art devices when considering its adaptability and utility.

Another object of the present invention is to provide a new and improved vari-torque shock absorber for a racing car which has low cost, lower weight and better adjustability and which may be adjusted within a short period of time, sometimes without removing the device from the racing car.

In carrying out this invention in one illustrative embodiment thereof, an adjustable damping rate shock absorber is provided having a torque tube carrying a torque rod and having a torque plate centrally and stationarily mounted on said torque rod which is movable in said torque tube. First and second stop plates are removably mounted adjacent opposite ends of the torque tube. A plurality of heavy duty coil springs grouped in two sets are removably mounted between the first and second stop plates and the torque plate. Mounting means is provided which includes a means coupled to the torque rod which is adapted to mount the shock absorber to the rear end of a racing vehicle.

Among the many advantages of the present invention are the ability to mount the shock absorber in two different ways with respect to the rear end without specially designing the shock absorber for each application. In addition, by loosening either the first or second stop nut, or both, the two sets of coil springs may be changed and different damping rates can be provided simply by using different sets of springs on either side of the torque plate.

BRIEF DESCRIPTION OF THE DRAWINGS

The invention, together with further objects, features, aspects and advantages thereof may be more clearly understood from the following description considered in conjunction with the accompanying drawings.

FIG. 1 is a perspective view of the vari-torque shock absorber in accordance with the present invention.

FIG. 2 is a cross-sectional view of the shock absorber shown in FIG. 1.

FIG. 3 shows a cross-sectional view taken along lines 3—3 of FIG. 2.

FIG. 4 is a side elevational view illustrating the so-called "three-point" configuration mounting of the shock absorber of the present invention applied to the rear end of a racing car.

FIG. 5 is a side elevational view taken along lines 5—5 of FIG. 4.

FIG. 6 is a side elevational view of the shock absorber of FIG. 4 showing one set of springs in compression due to a braking action being applied to the vehicle.

FIG. 7 is a side elevational view of the shock absorber of the present invention mounted in the so-called "four-point" configuration with the shock absorber mounted perpendicular to the racing car frame and having a free end.

DESCRIPTION OF THE PREFERRED EMBODIMENTS

Referring now to FIGS. 1 and 2, the vari-torque bar shock absorber, referred to generally with the reference character 10, has a torque tube 12 which carries a movable torque rod 14. A torque plate 16 is mounted on the torque rod 14 by a pin 18 which also extends through slots 13 in the torque tube 12 and slidably mounts the torque plate and the torque rod in the torque tube.

A first set of heavy-duty coil springs comprising springs 20, 22 and 24 are mounted on retainer or guide screws 26, 28 and 30, respectively, between first stop plate 32 and the torque plate 16. A second set of coil springs comprising springs 34, 36 and 38 are mounted on retainer or guide screws 40, 42 and 44, respectively, extending between a second stop plate 46 and the torque plate 16. Stop or lock nuts 48 and 50 are mounted on threaded portions on opposite ends of the torque tube 12. The torque rod 14 is threaded on one end 52 thereof accommodating a shank 54 bearing a mounting eye 56. On the opposite end a threaded shank 58 carrying an eye 60 is positioned in the torque tube 10 by a retainer nut 62 which can also be placed on the torque rod 14 depending on the application. The high load bearing parts; namely, the torque tube and torque rod, are constructed from heat treated alloy steels while the medium loads carried by the stop plates and torque plate may be made of aircraft grade aluminum alloys. The springs may be chrome, vanadium, heat treated and de-gassed alloys or polyurethane which are designed for long service and durability. The retainer or guide screws are also heat treated steel alloys and the pin 18 used in holding the assembly together has an ultimate shear strength of 200,000 foot pounds. The total unit 10 has a weight of less than five pounds.

It should be noted that dis-assembly may be accomplished from either end of the torque tube and that the two sets of springs 20, 22 and 24, as well as 34, 36 and 38 may be replaced individually with a different set of springs on either side of the torque plate 16 or both sets may be changed to provide one rate of adjustable damping for acceleration control and another totally different adjustable damping rate for deceleration control. The two sets of springs are positioned centrally around the torque rod 14 between the torque plate 16 and the stop plates 32 and 46.

As will best be seen in FIG. 3, one set of springs 20, 22 and 24, are separated by 120° on one side of the torque plate 16. The second set of springs 34, 36 and 38 are separated by 120° and are positioned on the other side of the torque plate 16 in an arrangement in which all of the springs are equally spaced at 60° around the axis 66 of the torque tube 12.

It should be noted that six evenly spaced holes 33 are provided in each stop plate 32 and 46 which will accommodate the mounting of six springs on either side of the torque plate 16. This 60° hole pattern provides great flexibility for accommodating different spring combinations which enhance the adjustability of the damping rates for the shock absorber. A combination of 2, 3, 4 or 6 springs may be mounted on either side of the torque plate 16 providing countless variations in the adjustability of the shock absorber. In any combination, the springs should be equally spaced on a given side to prevent binding, e.g., when using two springs they should be spaced 180° apart; three springs 120° apart; four springs 90° apart and six springs 60° spacing.

The two sets of springs are solidly mounted to the torque plate 16 and torque rod 14. The torque tube 12 is a fixture and guide for the torque rod 14 and torque plate 16, and the only items solidly mounted to the torque tube are the lock nuts 48 and 50.

The springs should be changed in sets to prevent binding. Changing the springs merely requires loosening the lock nut until the springs are loose, then loosening and removing the guide screws and changing the springs.

FIGS. 4 and 5 illustrate one way of mounting the vari-torque shock absorber 10 on the rear of a racing car in a manner which is referred to as a "three-point" suspension. In this mounting the eyes 56 and 60 of the shanks 54 and 58, respectively, are mounted on brackets 68 and 70, respectively. The bracket 68 is mounted on the rear end housing 72 carrying the vehicles differential. The other end of the shock absorber 10 is connected by bracket 70 to a framework 75 behind the driver's seat 76. The framework 75 includes frame rails 78 and lower support arms 80. It should be pointed out that the framework 75 is typical and may have different configurations and the vari-torque shock absorber 10 can be mounted in accordance with such configurations. In operation of the mounting as illustrated in FIGS. 4 and 5, under acceleration tires 82 run in a counterclockwise direction but the differential housing 72 moves in the opposite clockwise direction. This condition is known as a torque wrap-up which can be dangerous. However, by including the vari-torque bar shock absorber 10, the housing 72 is allowed to turn slightly and absorb and then release the torque gradually and is safer.

FIG. 6 illustrates the action of the shock absorber 10 mounted in the "three-point" installation as best seen in FIG. 4. When braking the racing vehicle, the set of springs 20, 22 and 24 are placed under compression forcing their respective guide screws 26, 28 and 30, respectively, outward through the openings in their stop plate 32. Simultaneously therewith, the second set of springs 34, 36 and 38 are just pulled along. A reverse action takes place when the vehicle is accelerated.

FIG. 7 illustrates what has been referred to as a "four-point" installation in which the eye 56 of the mounting shank 54 is mounted on a bracket 84 fixedly attached to the framework 75. In this configuration, a separate framework 85 provides arms 86 and 88 attached to the top and bottom of the rear end housing 72. The framework 85 is attached to the torque plate 12. In operation, on acceleration the framework 85 exerts an upward push on the assembly 10. On braking, the opposite takes place with the framework 86 exerting a downward pull on the shock absorber 10. Accordingly, regardless of whether there is deceleration or acceleration based on braking or stepping down on the throttle, the rear tires are continually held in contact with the track providing stability to the vehicle. Torque applied during the acceleration and deceleration are approximately 5 to 8 times more severe than those experienced in a normal passenger car, and accordingly, require the type of stabilization which is offered by the shock absorber of the present invention.

The shock absorber of the present invention is capable of adjustable damping rates which may be provided by using a different set of springs on either side in order to provide one rate for deceleration control. The vari-torque bar shock absorber has two sets of springs connected separately to a rod which is solidly mounted to the differential, and is either free on the upper end or mounted to the framework to provide a controlled area of movement of the spring assembly. This arrangement can easily accommodate mounting in existing applications in either a three or four point application.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

What is claimed is:

1. An adjustable damping rate shock absorber for absorbing shock loading created by the acceleration and deceleration of a racing vehicle comprising:

a torque plate having a diametrical opening therein adapted to receive a pin, a central opening extending through said torque plate and said diametrical opening, and transverse to said diametrical opening in said torque plate, a torque tube having diametrically opposed longitudinal slots therein, a torque rod slidably carried by said torque tube having a diametrical opening near one end thereof, a pin for mounting said torque rod to said torque plate, said pin extending through said diametrical openings in said torque plate and torque rod, said torque rod being slidably movable in said torque tube with said torque plate being movable by said pin sliding in said diametrically opposed longitudinal slots in said torque tube, first and second stop plates removably mounted adjacent opposite ends of said torque tube,
six equally spaced openings in said first and second stop plates surrounding said torque tube,
a plurality of guide screws removably mounted in said spaced openings in said first and second stop plates,
a plurality of heavy duty coiled springs having at least three springs in first and second sets which are equally spaced and visually exposed and removably mounted on said guide screws, said first set between said first stop plate and said torque plate and said second set between said second stop plate and said torque plate,
first and second stop nuts respectively mounted on opposite ends of said torque tube for removably mounting said first and second stop plates adjacent said opposite ends of said torque tube whereby repair or change of either one or a complete set of springs is accomplished by loosening said first or second stop nuts or both and removing the guide screws carrying the springs to be removed or replaced,
and mounting means including means coupled to said torque rod and to said torque tube for mounting said shock absorber to the rear end of a racing vehicle.

2. The adjustable damping rate shock absorber as claimed in claim 1 in which said first and second sets of equally spaced springs are angularly spaced around said torque tube and said first set has a different angular spacing from said second set.

3. The adjustable damping rate shock absorber as claimed in claim 2 in which said first set of springs has a different number of springs then said second set of springs.

* * * * *